US006959497B2

(12) United States Patent
Leidinger

(10) Patent No.: US 6,959,497 B2
(45) Date of Patent: *Nov. 1, 2005

(54) DEVICE FOR RECORDING THE ANGLE OF ROTATION BETWEEN TWO COMPONENTS

(75) Inventor: Gustav Leidinger, Priedberg (DE)

(73) Assignee: O & K Orenstein and Koppel AG, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/258,318
(22) PCT Filed: Apr. 28, 2001
(86) PCT No.: PCT/DE01/01643

§ 371 (c)(1),
(2), (4) Date: May 1, 2003

(87) PCT Pub. No.: WO01/86226

PCT Pub. Date: Nov. 15, 2001

(65) Prior Publication Data

US 2003/0163926 A1 Sep. 4, 2003

(30) Foreign Application Priority Data

May 11, 2000 (DE) .......................................... 100 23 196

(51) Int. Cl.[7] .............................................. G01B 7/00
(52) U.S. Cl. ........................................ 33/1 PT; 33/534
(58) Field of Search ................................ 33/1 PT, 1 N, 33/534, 503

(56) References Cited

U.S. PATENT DOCUMENTS

| 3,438,646 | A |   | 4/1969  | Hannapel |         |
|-----------|---|---|---------|----------|---------|
| 3,498,254 | A | * | 3/1970  | Heidenhain et al. | 235/486 |
| 4,139,947 | A | * | 2/1979  | Possati  | 33/531  |
| 4,775,026 | A |   | 10/1988 | Sollbach et al. | |
| 4,866,981 | A |   | 9/1989  | Matsumoto et al. | |
| 4,903,525 | A |   | 2/1990  | Chiba et al. | |
| 5,366,042 | A |   | 11/1994 | Wilks et al. | |
| 5,408,894 | A |   | 4/1995  | Henson | |
| 5,636,703 | A |   | 6/1997  | Papke et al. | |
| 5,647,396 | A |   | 7/1997  | Stommes et al. | |
| 5,661,890 | A |   | 9/1997  | Pfaffenberger | |
| 5,981,940 | A | * | 11/1999 | Setbacken et al. | 250/231.13 |
| 6,237,906 | B1 |  | 5/2001  | Deans et al. | |
| 6,261,182 | B1 |  | 7/2001  | Chino et al. | |
| 6,293,022 | B1 |  | 9/2001  | Chino et al. | |
| 6,311,402 | B1 | * | 11/2001 | Brandl et al. | 33/1 PT |
| 6,417,664 | B1 |  | 7/2002  | Ventroni et al. | |
| 6,460,429 | B1 |  | 10/2002 | Staker | |
| 6,486,764 | B2 |  | 11/2002 | Byram | |
| 6,494,471 | B2 |  | 12/2002 | Lukac | |
| 6,502,839 | B1 |  | 1/2003  | Chino et al. | |
| 6,568,696 | B2 |  | 5/2003  | Osborn et al. | |
| 6,597,168 | B1 |  | 7/2003  | Lee | |

FOREIGN PATENT DOCUMENTS

| DE | 3537235  | 4/1987 |
| DE | 19941168 | 3/2000 |

* cited by examiner

Primary Examiner—Diego Gutierrez
Assistant Examiner—Tania Courson
(74) Attorney, Agent, or Firm—John William Stader

(57) ABSTRACT

The invention relates to a device for detecting the angle of rotation between two components (1, 2), which are rotatably interconnected via a pin (3). Said device comprises an angle sensor (5), which is directly or indirectly connected to one of the two components (1 or 2) in a rotationally fixed manner and whose sensor shaft (8) is rotatably fixed to the other component (2 or 1) via a lever-shaped driver (9), whereby the angle of rotation is detected by the angle sensor (5) from the twisting of the sensor shaft (8). The aim of the invention is to improve the device of the aforementioned type such that the angle of rotation between two components can be detected in a significantly more precise manner, and such that the device can be used in a more reliable and practical manner. To this end, the invention provides that the sensor shaft (8) is connected to the driver (9) via at least one torsion-proof flexible element (11, 12).

Figure 1:
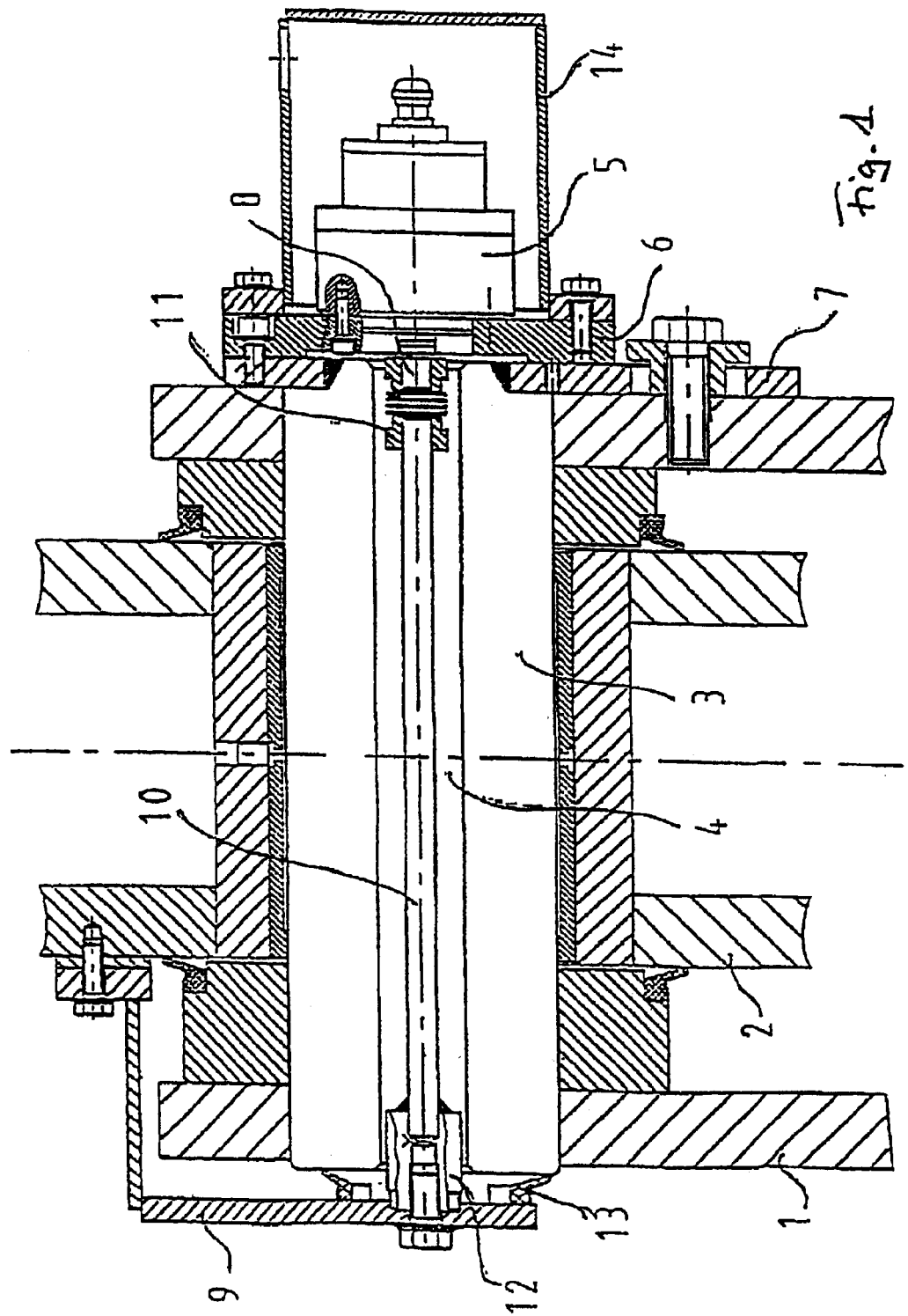

14 Claims, 2 Drawing Sheets $\alpha \neq \alpha'$ $\alpha = \alpha'$

DEVICE FOR RECORDING THE ANGLE OF ROTATION BETWEEN TWO COMPONENTS

The invention concerns a device for recording the angle of rotation between two components, which are joined to each other by a bolt so that they can rotate, with an angular sensor, which is joined directly or indirectly with the first of the two components so that it cannot rotate relative to it, and its sensor shaft is joined by a lever shaped catch with the second component so that it cannot rotate, in which the angle of rotation from the angular sensor is recorded via the rotation of the sensor shaft.

With the increasing automation of sequences of movement of implements for construction machines, agricultural machines, cranes, but also municipal vehicles, the task of recording the angular position of components, such as lifting frames, jibs or similar elements, either relative to the bearing frames or between two of the said components relative to each other, in order either to display their position to the operator or to regulate and control the sequence of movements in accordance with a prescribed control program.

The connection of the said components with the frame carrying them or of two components with each other occurs in by far the majority of case through a bolt bearing, which permits a relative rotation of the two connected components with one degree of freedom relative to each other. More rarely sliding joints with likewise only one degree of freedom or joints with several degrees of freedom, such as e.g. ball joints, are employed.

The invention relates to the first-cited arrangement, in which angular sensors are employed in preference, which record the relative angle between the two components which are joined my means of bolts. The predominant type of construction of such angular sensors is such that a shaft turns in bearings fixed centrally in a usually cylindrical casing, by which the angle to be recorded between two components joined together pivoted is passed into the angular sensor. In this the angle is now transformed by means of a potentiometer or inductively into an electrical signal, which is used either for displaying the relative position of the recorded components to the operator or it serves as an input signal for an electronic control unit, in which it is linked with the control program, in order to achieve the desired movements of the recorded components and others which are in a relationship with them.

In a generic device the introduction of the rotary motion on the sensor shaft of the angular sensor occurs hitherto, in that on the sensor shaft a catch in the form of a lever is attached such that it cannot turn (positively locked by form or by force). The casing of the angular sensor is fixed with a spacer onto one of the two components, the angular position of which is to be recorded, in such a position that the centre line of the sensor shaft which turns in bearings in the casing is in alignment with the bolt which joins the two components so that they articulate. At the same time, the front side of the casing of the angular sensor is kept at a distance from this supporting component by the spacer so that the catch can turn with an appropriate safety distance in front of it relative to the component fixed to the angular sensor. On the other hand, about the bolt joining the two components in relation to the component turning the angular sensor a pin, usually in cylindrical form, is fixed parallel to the axis of the bolt, which engages with its free end in a recess of the catch of the angular transmitter. The pin must be movable in a radial direction within the recess of the catch, in order not to become bent by the unavoidable bearing play of the bolt joining the two components or in a more massive design to exert no undue forces on the shaft bearings of the angular sensor.

Now if one of the two components joined by the bolt performs a turning movement around the other one, then the pin turns the sensor shaft with it by means of the catch attached to the shaft of the angular sensor. This hitherto usual arrangement of angular sensors exhibits a number of drawbacks, which impair both a safe and practical application and also the accuracy of the angle of rotation to be recorded.

A precise transfer of the angle of rotation between the two components turning around the bolt joining them is guaranteed only if the centre line of the sensor shaft of the angular sensor is aligned precisely with that of the bolt. This alignment is difficult to produce in practice, since because of the spacer required by the catch and because of the possible angle of rotation of the components and with it also of the catch of up to 180°, centering on the angular sensor and on the component of this spacer can be included only in a correspondingly small radian measure and therefore only a placing of the arc of the spacer on the centerings, but no centering in the actual sense exists. A more precise connection is at best to be produced, in that the arc-shaped spacer on both sides bears two plates standing parallel to each other with aligned centres. However, such a part is to be produced only comparatively expensively.

Play in the bolt acts in a similar manner. If the part which turns around the bolt moves within the bearing clearance in a direction perpendicular to the instantaneous position of the catch, then the sensor shaft of the angular sensor experiences a turning movement, without the two components having altered their angular position relative to each other. Thus, the angular sensor records a change in angle that did not occur. Since with the rough operation of working machines such as e.g. excavators, up to exchange of the bearings some 0.1 mm clearance is accepted and the ratio of the entire length of the jib to the catch can amount to several hundredfold, as a result the deviation in the excavation width of the machine in profiling work can attain values which lie outside acceptable tolerances.

Also the pin, which is fixed to the component which turns around the connecting bolt and engages with the catch, exhibits a certain play in this in the circumferential direction of the rotary movement, which on reversal of the direction of rotation of the two components relative to each other must first be bridged, until the catch then moves in the opposite direction. This play too enters as a distortion of the angle.

Furthermore, angular sensors on working machines, such as earth-moving equipment, agricultural machines and suchlike, must frequently be fixed on places, where they either come into direct contact with the material to be handled or are exposed to impacts through material that is thrown around or falls down. Therefore protective covers are to be provided for, which protect both the casing of the angular sensor and the catch, as the effect of an impact on this can damage the sensor shaft of the angular sensor and its bearings. Indeed the spacer can be so designed that with the cover it forms an integrated component, nevertheless there inevitably remains in the region of the arc-shaped track of the pin a gap, through which material from outside can penetrate.

The task of the invention is therefore, to so improve a generic device, that the angle of rotation between two components can be recorded significantly more accurately and the device is usable safely and practically.

This task is solved in accordance with the invention for a device of the type described at the beginning in that the sensor shaft is connected with the catch by at least one element that has high torsional stiffness and is flexurally elastic.

On the basis of this design a generally more precise recording of the angle of rotation is then guaranteed, even if no exact alignment between the axis of the sensor shaft of the angular sensor and the bolt exists, since on a deviation from exact alignment merely the part, pointing in the direction of the catch, of at least one torsionally stiff but flexurally elastic element between the sensor shaft and the catch comes to lie within certain limits obliquely to the aligning axis. This applies also if a bearing clearance arises between the bolt and the component turning around it. On radial movement of the component within the bearing clearance, the catch joined tightly to the component executes the same movement, so that the part of the axis of the torsionally stiff but flexurally elastic element pointing in the direction of the catch is displaced in relation to the axis of the sensor shaft by the same amount. Nevertheless, the sensor shaft of the angular sensor is turned by the same angle, as occurs between the two components.

In a quite particularly preferred arrangement it is envisaged that the sensor shaft is joined via a first torsionally stiff but flexurally elastic element to a connecting shaft, the other end of which is connected with the catch via second torsionally stiff but flexurally elastic element. With this arrangement even larger deviations from exact alignment between the sensor shaft and the bolt can be compensated for, as with such a deviation only the connecting shaft is inclined or displaced in relation to the axis of the bolt. This applies equally also where there is a bearing clearance between the bolt and the component turning around it.

Quite particularly preferred, it is envisaged that the connecting shaft is arranged within an essentially concentric longitudinal drilling of the bolt essentially coaxially to the longitudinal drilling, into one end of which the sensor shaft projects The connecting shaft can thus be accommodated in a particularly space saving manner. The diminution of the section modulus of the bolt thus caused is, because of the small ratio of the diameter of the drilling to the external diameter of the bolt, negligibly small and therefore without influence on the dimensioning of the bolt itself, as on the two components, which results in forces acting on them towards the exterior.

In a more advantageous arrangement it is envisaged that the first torsionally stiff but flexurally elastic element is formed as a bellows, in particular as a metal bellows. Instead of such a metal bellows, also universal joints or rubber (plastic) couplings can be employed.

The second torsionally stiff element is formed preferably as a sleeve, which is joined both with the catch and also with the connecting shaft so that it cannot twist. Instead of this however, also torsionally stiff and at the same time flexurally elastic elements, for example likewise in the form of a universal joint or suchlike can be employed.

An angular sensor of a conventional construction can, depending upon the design of the mountings of its casing, which lie usually on its front surface, be attached directly or through a base plate on the bolt, on a bolt retaining plate or on the first component, provided that the angular sensor's casing has an appropriately large diameter.

In order to guarantee as perfect as possible functioning of the device, the catch is fixed advantageously at a distance from the bolt.

Protection of the device against influences from outside can be realised in a simple manner, in that between the catch and the front surface of the bolt a gasket is arranged for sealing off the longitudinal drilling of the bolt In order to protect the angular sensor against mechanical stresses from outside, it is advantageously envisaged that the distance between the catch and the front side of the bolt is so chosen that in the event of lying of the catch on the front side of the bolt, this axial movement transmitted by the connecting shaft onto the bellows is acceptable by the bellows.

In addition, for the protection of the angular sensor it is envisaged, that the casing of the angular sensor is surrounded by one of these completely enclosing protective covers, which is fixed on the casing of the angular sensor or on its base plate.

Figure 2:
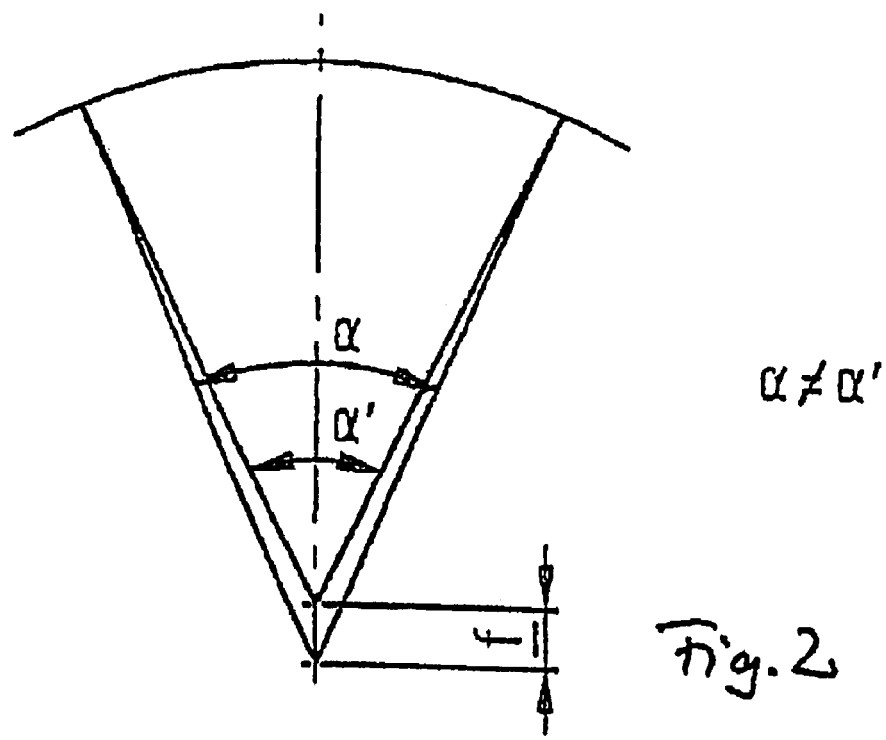
Figure 3:
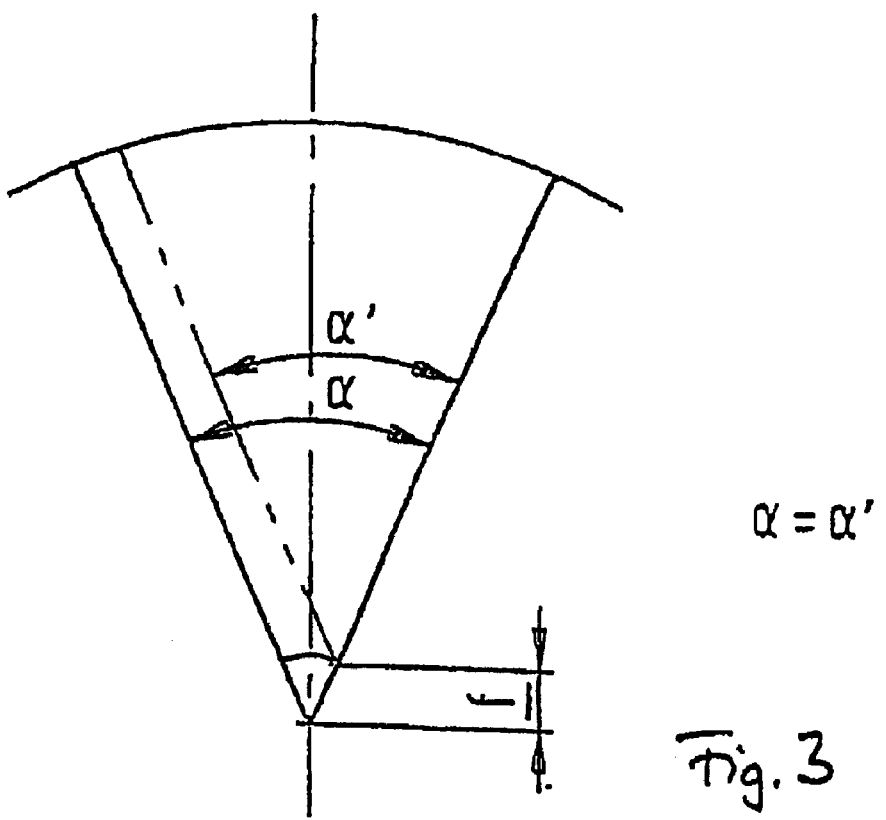

The invention is explained in more detail below in an exemplary manner using the drawing. These show in:

FIG. 1 a section through a device in accordance with the invention,

FIG. 2 the angular error for a displacement of the axis of the sensor shaft of an angular sensor and the axis of the bolt for a device according to the state of the art and FIG. 3 the relevant geometric relationships in a device in accordance with the invention.

One example of an embodiment of a device in accordance with the invention for recording the angle of rotation between two components, namely a first component (1) and a second component (2), is depicted in FIG. 2. The two components (1) and (2), for which the angular position and its change are to be recorded, are connected with each other by means of a bolt (3) so that they can turn. This bolt (3) possesses, in contrast to known variant forms, in addition a continuous drilling (4) of small diameter lying centrally to its longitudinal axis. The diminution of its section modulus thus caused is negligibly small because of the small ratio of the diameter of the drilling to the external diameter of the bolt (3) and therefore has no influence on the dimensioning of the bolt (3) itself, and on the components (1) and (2), which result according to the external forces acting upon them.

An angular sensor (5) of conventional construction, which serves to record the relative angular position and change of the two components (1) and (2), depending upon the design of the fixings of its casing, which lie mostly on its front surface, can be fixed either directly or by a base plate (6) directly on the bolt (3) or, as depicted in FIG. 1, on its fixing bracket (7). With a correspondingly large diameter of the angular sensor (5) or correspondingly large dimensions of its base plate (6) in proportion to the diameter of the bolt (3), the attachment can be effected also directly on the first component (1).

An exact alignment of the axis of the sensor shaft (8) of the angular sensor (5) with the axis of the drilling (4) of the bolt (3) is not necessary for the precise transmission of the angle between the two components (1) and (2) to the sensor shaft (8). A centring between the casing of the angular sensor (5) or on assembly by a base plate (6) between this and the counterpart, which depending upon the type of fixing or dimensioning of the component of the bolt (3), which can be its fixing bracket (7) or the first component (1) itself, is therefore indispensable. If it is nevertheless provided for, it can serve to facilitate assembly.

A catch (9) of the device, which records the relative movement of the second component relative to the first component (1) and in a further sequence has to transfer it to the sensor shaft (8) of the angular sensor (5), is attached to the bearing opposite to this side on the second component (2). Here too it is not necessary for precise transmission of the angle of rotation that the recess opening of the catch (9), in which a torsionally stiff element in the form of a sleeve (12), subsequently described in more detail in the following, is attached, lies centrally to the axis of the drilling (4) of the bolt (3).

The turning motion is transmitted from the catch (9), via a connecting shaft (10) arranged within the drilling (4) of the bolt (3), to the sensor shaft (8) of the angular sensor (5). This connecting shaft (10) can be formed as a solid shaft or as a tube, and can be dimensioned small, as it merely has to transmit the usually small torque required for actuation of the angular sensor (5). The connection of this connecting shaft (10) with the sensor shaft (8) is effected via a torsionally stiff but flexurally elastic element, which as an example can be formed preferably as a metallic bellows (11). Instead of this however, also universal joints or rubber(plastic) couplings can be employed. The connection between the connecting shaft (10) and the catch can, as depicted, occur via a torsionally stiff sleeve (12), which is firmly joined both with the connecting shaft (10) and also with the catch (9). Also at this connecting point other torsionally stiff and at the same time flexurally elastic elements, as described at the other end of the connecting shaft (10), are possible.

Protection of the device against influences from outside, e.g. penetration of dirt or effects of impacts, is assured in a simple manner. For this between the catch (9) and the bolt (3) a gasket (13) is envisaged, which with a greater diameter can seal off also to the first component (1). It prevents the penetration of dirt into the drilling (4) within the bolt (3). The angular sensor (5) itself can be protected with a protective cover (14) which completely enshrouds it, which is fixed to the base plate (6) in a simple manner, or in the absence of this base plate (6) is fixed directly on the holding bracket (7) of the bolt (3) or is attached to the first component (1).

Through the arrangement in accordance with the invention, as regards the functionality of the system significant advantages arise, which are not achievable with the previous generic arrangements of an angular sensor.

If no exact alignment is required, either between the axis of the sensor shaft (8) of the angular sensor (5) and the drilling (4) of the bolt (3), or on the opposite side of the bearing between the axis if the sleeve (12) firmly joined with the catch (9)—or another previously mentioned element between the catch (9) and the connecting shaft (10)—and the drilling (4). In the event of a deviation from exact alignment, only the connecting shaft (10) lies within the drilling (4) eccentrically in relation to the axis of the drilling (4) or obliquely to it. However, always the angle of rotation of the second component (2) relative to the first component (1) is transferred to the sensor shaft (8) of the angular sensor (5). This applies also, if a bearing clearance between the bolt (3) and the second component (2) turning around it occurs. On radial motion of the second component (2) within the bearing clearance the catch (9) firmly fixed to the second component (2) executes the same motion, so that the axis of the sleeve (12) is displaced radially in relation to the axis of the drilling (4) of the bolt (3) by the same amount. Nevertheless, the connecting shaft (10) and with it also the sensor shaft (8) of the angular sensor (5) is turned by exactly the same angle, as occurs between the second component (2) and the first component (1).

This geometric relationship emerges from FIG. 3. The centre point of the sleeve (12) and with it also the connecting shaft fixed in it wanders on the rotation of the second component (2) by a certain angle in an arc around the first component (1). The connecting shaft (10) itself is hereby turned by exactly the same angle. On a deviation from the alignment, the connecting shaft (10) when using a rigid sleeve (12) deviations and bearing play occurring in the usual arrangement of bearings it is bent only slightly, i.e. well within its elastic range and in the further sequence exert only small radial forces on the sensor shaft (8) of the angular sensors (5). As the connecting shaft (10) is solidly joined with the catch (9), by the sleeve (12) or another torsionally stiff but flexurally elastic element, at this point in contrast to the previously known solutions no play exists, so that also on reversal of the direction of rotation of the second component (2) relative to the first component (1) no distortion of angle to be transmitted can occur through bridging of a clearance.

In comparison with this, FIG. 2 shows for a generic device in accordance with the state of the art, the angular error for an offset of the axis of the sensor shaft and the axis of the bolt joining the components under the assumption of a vertical displacement for halving of the angle of rotation.

Through the arrangement in accordance with the invention it is therefore guaranteed under all circumstances, that the angle of rotation between components (1) and (2) is passed exactly into the angular sensor (5) and therefore from this, as far as the recording of the angle relates to mechanical means, no erroneous values can be output.

The entire device is fully encapsulated against penetration of dirt and the dimensioning of the protective cover (14) of the angular sensor (5) and the design of the catch (9) can be executed so that they withstand the mechanical hazards, to which the bearing is exposed in use. The width of the annular gap between the catch (9) and the bolt (3), which is sealed by the gasket (13), can be kept small. In the event of an unexpectedly large influence of force on the catch (9) in an axial direction this bolt (3) comes close to it, by which the connecting shaft (10) experiences the same axial displacement. This displacement motion is taken up by the metallic bellows (11), so that the sensor shaft (8) of the angular sensor (5) experiences only slight or no axial loading. Therefore in the most unfavourable case large influences of force are suffered merely by the simply constructed catch (9), the more expensive angular sensor (5) is not damaged.

Naturally, the invention is not limited to the exemplary embodiment depicted. Further arrangements are possible, without departing from the basic ideas. Thus, the torsionally stiff but flexurally elastic elements (11, 12) can be realised also in other ways and suchlike more.

What is claimed is:

1. A device for the recording of an angle of rotation between a first component and a second component in which he first component is connected to a bolt so that it cannot turn, said second component being arranged around the outer circumference of said bolt and extending over a part of a length of said first component so that said second component is capable of turning about said bolt relative to said first component, said device including an angular sensor for recording the angle of rotation, said angular sensor being fixed to one of said first and second components and including a sensor shaft for recording the angle of rotation about an axis of rotation of the sensor shaft and which is connected with the other of said first and second components by at least one torsionally stiff but flexibly elastic element, said first and second components being capable of limited relative radial movement during said turning of said second component about said bolt relative to said first component as a result of radial play between said bolt and at least one of said components, the improvement comprising:

said angular sensor being connected positionally fixed with respect to said first component so that said angular sensor cannot turn; and a connecting shaft positioned within a coaxial longitudinal passage formed in said bolt and operably coupled at one end thereof to said sensor shaft, said connecting shaft having a diameter that is smaller than said coaxial longitudinal passage, said torsionally stiff but flexibly elastic element being imposed between said connecting shaft and said sensor shaft, said connecting shaft having a second end including a catch which is fixed to the second component at a location radially outwardly of and adjacent to an end of the bolt opposite the angular sensor so as to turn with said second component about said bolt relative to said first component and so as to move radilly with said second component relative to said bolt and said first component, and such that if any of said limited relative radial movement of said first and second components occurs as said second component is turned by an angle of rotation relative to said first component, said torsionally stiff but flexibly elastic element will flex sufficiently such hat said sensor shaft will be turned relative to said angular sensor by an angle of rotation equal to said angle of rotation by which said second component is turned relative to said first component.

2. The device of claim 1 wherein said angular sensor includes a casing fixed to a bolt retaining plate connected to said bolt.

3. The device of claim 2 wherein the casing of the angular sensor is surrounded by a protective cover which is fixed to the casing of the angular sensor for completely enclosing said casing.

4. The device of claim 1 wherein a second torsionally stiff but flexibly elastic element is positioned between said catch and said second end of said connecting shaft.

5. The device of claim 4 wherein said first torsionally stiff but flexibly elastic element is formed as a metallic bellows.

6. The device of claim 5 wherein the catch is fixed at such a distance from the bolt that, in the event of the lying of the catch on a front side of the bolt, axial motion transmitted by the connecting shaft to the bellows is permitted.

7. The device of claim 6 wherein a gasket is positioned between the catch and the front side of the bolt for sealing the coaxial longitudinal passage in said bolt.

8. The device of claim 4 wherein said second torsionally stiff but flexibly elastic element is formed as a sleeve, which is firmly joined both with the catch and the connecting shaft.

9. Apparatus for recording an angle of relative rotation between a first component and a second component connected by a bolt for relative rotation about a rotational axis through the bolt, the bolt allowing some relative radial movement of the components as a result of radial play between the bolt and at least one of the components, the apparatus comprising:

a sensor device including a sensor shaft rotatable about a rotary shaft axis therethrough, the sensor device being fixedly mounted on the first component for radial movement and rotation therewith about the rotational axis such that the sensor shaft is disposed at least substantially coaxial to the rotational axis in or adjacent to a first axial end of a passage extending at least generally axially through the bolt;

a catch fixedly mounted on the second component at a location spaced radially outwardly from the rotational axis for radial movement and rotation with the second component generally about the rotational axis relative to the bolt and the first component, the catch extending radially inwardly to a location in or adjacent to a second axial end of the passage through the bolt opposite the first axial end of the passage; and a connecting shaft having a radial extent less than a radial extent of the passage extending through the passage, the connecting shaft connecting the catch and the sensor shaft for joint rotation with the second component relative to the first component, including at least one torsionally stiff but flexibly elastic element disposed and being sufficiently flexible for allowing some relative radial movements of the catch and the sensor shaft corresponding to any relative radial movement of the components as a result of the radial play between the bolt and the at least one of the components, such that if the first and second components are relatively rotated by an angle of rotation and simultaneously relatively radially moved, the at least one torsionally stiff but flexibly elastic element will be correspondingly flexed and the sensor shaft will be rotated relative to the sensor device by an angle of rotation equal to the angle of relative rotation of the components.

10. The apparatus of claim 9, wherein the first component includes spaced apart elements and the second component is located in the space between the elements, and wherein the catch has a lever shape which extends axially away from the second component beside one of the elements of the first component to a location radially outwardly of and axially beyond the one element of the first component, and from the location axially beyond the one element of the first component radially inwardly to the location in or adjacent to the second axial end of the passage through the bolt.

11. The apparatus of claim 9, wherein the at least one torsionally stiff but flexibly elastic element includes a torsionally stiff but flexibly elastic element connecting the connecting shaft to the sensor shaft.

12. The apparatus of claim 11, wherein the at least one torsionally stiff but flexibly elastic element comprises a second torsionally stiff but flexibly elastic element connecting the connecting shaft to the catch.

13. The apparatus of claim 12, wherein the second torsionally stiff but flexibly elastic element comprises a sleeve connected between the connecting shaft and the catch.

14. The apparatus of claim 9, wherein the at least one torsionally stiff but flexibly elastic element comprises a metallic bellows connected between the sensor shaft and the connecting shaft.

* * * * *